US010487752B2

(12) United States Patent
Fiedler et al.

(10) Patent No.: US 10,487,752 B2
(45) Date of Patent: Nov. 26, 2019

(54) OVERTHRUST PROTECTION SYSTEM AND METHOD

(71) Applicant: PRATT & WHITNEY CANADA CORP., Longueuil (CA)

(72) Inventors: Janusz Fiedler, Oakville (CA); Tatjana Pekovic, Saint-Lambert (CA); Dave Sellors, Burlington (CA); Amandeep Singh Chahal, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 237 days.

(21) Appl. No.: 14/644,796

(22) Filed: Mar. 11, 2015

(65) Prior Publication Data

US 2016/0265445 A1    Sep. 15, 2016

(51) Int. Cl.
*F02C 9/46* (2006.01)
*G05B 9/03* (2006.01)
(Continued)

(52) U.S. Cl.
CPC ............... *F02C 9/46* (2013.01); *B64D 31/10* (2013.01); *F01D 21/00* (2013.01); *F01D 21/02* (2013.01);
(Continued)

(58) Field of Classification Search
CPC ......... F05D 2270/021; F05D 2270/094; F05D 2270/02; F05D 2207/042; F05D 2207/051;
(Continued)

(56) References Cited

U.S. PATENT DOCUMENTS 3,513,899 A * 5/1970 Paduch .................. F02C 9/28
60/39.27
4,136,517 A  1/1979 Brown
(Continued)

FOREIGN PATENT DOCUMENTS

WO   WO 2013/160626   10/2013
WO   WO 2014/053752   4/2014

OTHER PUBLICATIONS

Federal Aviation Administration (FAA), Advisory Circular: Compliance Criteria for 14 CFR 33.28, Aircraft Engines, Electrical and Electronic Engine Control Systems, Jun. 29, 2001, US Department of Transportation, p. 10 (AC#33.28-1).*
(Continued)

*Primary Examiner* — Ted Kim
*Assistant Examiner* — Stephanie Cheng
(74) *Attorney, Agent, or Firm* — Norton Rose Fulbright Canada LLP

(57) ABSTRACT

An overthrust protection system for an aircraft engine. The system comprises an engine overspeed protection unit comprising overspeed logic and an overspeed solenoid valve controlled by the overspeed logic, the overspeed logic configured to energize the overspeed solenoid valve for removing fuel flow to the engine upon detection of an overspeed condition of the aircraft engine; and an overthrust controller coupled to the overspeed protection unit and configured to measure engine thrust and to detect an overthrust condition when an engine thrust threshold has been exceeded, and configured to trigger energizing of the overspeed solenoid valve upon detection of the overthrust condition and an aircraft-on-ground condition.

8 Claims, 5 Drawing Sheets

(51) Int. Cl.
  *F01D 21/00* (2006.01)
  *F01D 21/02* (2006.01)
  *F02C 9/26* (2006.01)
  *F02C 9/28* (2006.01)
  *F02C 9/44* (2006.01)
  *B64D 31/10* (2006.01)
(52) U.S. Cl.
  CPC ............ *F02C 9/263* (2013.01); *F02C 9/28* (2013.01); *F02C 9/44* (2013.01); *G05B 9/03* (2013.01); *F05D 2270/021* (2013.01); *F05D 2270/051* (2013.01); *F05D 2270/62* (2013.01)
(58) Field of Classification Search
  CPC .... F01D 21/02; F02C 9/52; F02C 9/18; F02C 6/18; B64D 2205/00; G05B 9/03
  USPC .......................................................... 60/794
  See application file for complete search history.

(56) References Cited

U.S. PATENT DOCUMENTS

| | | | | |
|---|---|---|---|---|
| 4,521,894 A | * | 6/1985 | Moffat | H02H 7/093 377/16 |
| 5,893,040 A | | 4/1999 | Gunn et al. | |
| 6,075,685 A | * | 6/2000 | Reed | H02H 7/093 361/115 |
| 6,321,525 B1 | * | 11/2001 | Rogers | F01D 17/06 60/39.281 |
| 6,578,794 B1 | * | 6/2003 | Clark | G05B 9/03 244/194 |
| 6,655,126 B2 | | 12/2003 | Walker et al. | |
| 6,704,630 B2 | * | 3/2004 | Ostrom | F01D 21/00 701/29.2 |
| 9,932,906 B2 | | 4/2018 | Xiong et al. | |
| 2003/0205042 A1 | * | 11/2003 | Walker | F02C 9/28 60/204 |
| 2006/0283191 A1 | | 12/2006 | Horswill et al. | |
| 2011/0041512 A1 | * | 2/2011 | Tezuka | F02C 9/28 60/779 |
| 2015/0027412 A1 | * | 1/2015 | Henson | F02C 7/236 123/457 |
| 2015/0082802 A1 | * | 3/2015 | Cointe | F02C 9/28 60/779 |
| 2015/0219528 A1 | * | 8/2015 | Djelassi | F02C 9/28 702/44 |
| 2016/0004255 A1 | * | 1/2016 | Moxon | G05D 1/0055 701/7 |

OTHER PUBLICATIONS

Woodward, ProTech 203 Overspeed Protection System: Dual Relay, Remote Overspeed Test, 1995, Woodward, Manual 85201.*

Nihad Daidzic, "Jet engine thrust ratings", Turbofan Technology, Sep. 2012, ResearchGate, originally published in Professional Pilot magazine, retrieved Aug. 1, 2018 at https://www.researchgate.net/publication/316515941.*

Department of Transportation: Federal Aviation Administration (FAA), Section 33.87: "33.85 Calibration tests", 2010, CFR-2010, title 14, vol. 11 sec 33.87, p. 869 (Year: 2010).*

Federal Aviation Administration, Section 2: Pilot Guide to Takeoff Safety: Takeoff Safety Training Aid, Oct. 2013, FAA, pp. 2.1-42 (Year: 2013).*

* cited by examiner

OVERTHRUST PROTECTION SYSTEM AND METHOD

TECHNICAL FIELD

The present invention relates to the field of gas turbine engine control, and more particularly, to the detection and control of high thrust events.

BACKGROUND OF THE ART

An "uncontrollably high thrust" (UHT) event refers to an extremely rare situation where an unexpected increase in engine thrust occurs in ground operation, i.e. beyond a commanded engine thrust. In such a hypothetical event, the engine further fails to respond to a command to reduce the thrust. Such events may occur, for example, when an engine is on the ground and a takeoff is aborted. As part of the rigorous safety systems on civil-certified aircraft, there is a need for a safety mechanism to automatically shut down the aircraft's engine should a UHT event occur while the aircraft is operated on the ground.

SUMMARY

There is described herein a safety mechanism to automatically detect an uncontrollable high thrust (UHT) event while an aircraft is operating on the ground and in response, shut down the engine of the aircraft.

In accordance with a first broad aspect, there is provided an overthrust protection system for an aircraft engine. The system comprises an engine overspeed protection unit comprising overspeed logic and an overspeed solenoid valve controlled by the overspeed logic, the overspeed logic configured to energize the overspeed solenoid valve for removing fuel flow to the engine upon detection of an overspeed condition of the aircraft engine; and an overthrust controller coupled to the overspeed protection unit and configured to measure engine thrust and to detect an overthrust condition when an engine thrust threshold has been exceeded, and configured to trigger energizing of the overspeed solenoid valve upon detection of the overthrust condition and of an aircraft-on-ground condition.

In accordance with another broad aspect, there is provided a method for overthrust protection in an aircraft. The method comprises measuring engine thrust from an engine of the aircraft; detecting an overthrust condition when the measured engine thrust exceeds an engine thrust threshold; detecting an aircraft-on-ground condition; and upon detecting the overthrust condition and the aircraft-on-ground condition, energizing an overspeed solenoid valve to perform engine shutdown, the overspeed solenoid valve forming an engine overspeed protection unit with overspeed logic, the overspeed logic configured to energize the overspeed solenoid valve for removing fuel flow to the engine upon detection of an overspeed condition of the aircraft engine.

In accordance with yet another broad aspect, there is provided an overthrust protection system for an aircraft engine. The system comprises an electronic engine control (EEC) comprising overspeed logic and an overthrust protection controller, the overthrust protection controller configured to detect an overthrust condition when a measured engine thrust exceeds an engine thrust threshold and provide the overspeed logic with an overthrust condition control signal; wiring to connect a weight on wheels pin of an airframe to the overspeed logic to enable a response of the overspeed logic to the overthrust condition control signal; and an overspeed solenoid valve coupled to the overspeed logic and responsive to a command from the overspeed logic to shut down the engine.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
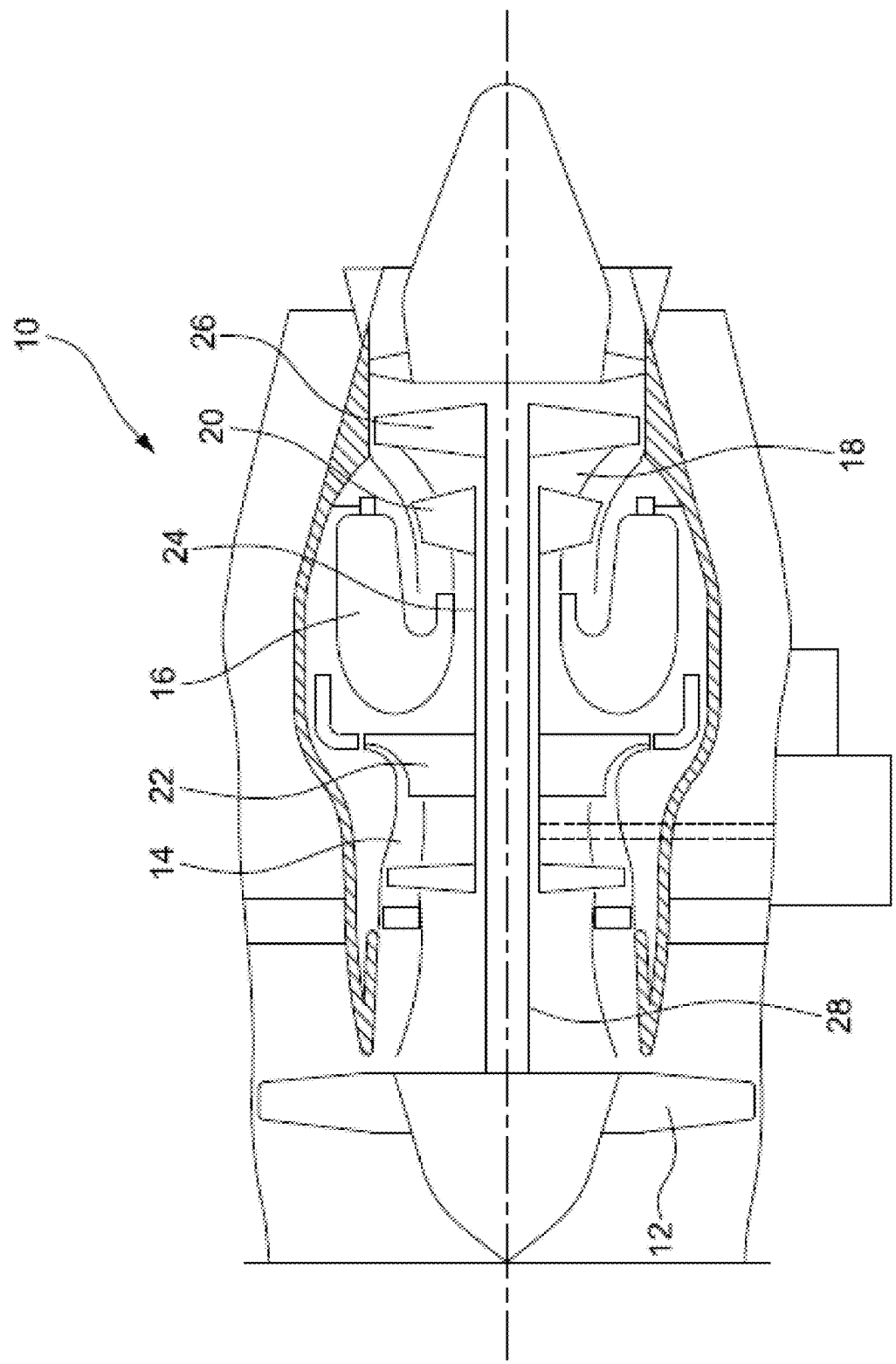
FIG. 1 is a schematic diagram of an exemplary gas turbine engine.

FIG. 1 illustrates a gas turbine engine 10 of a type typically provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom. Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply.

Figure 2:
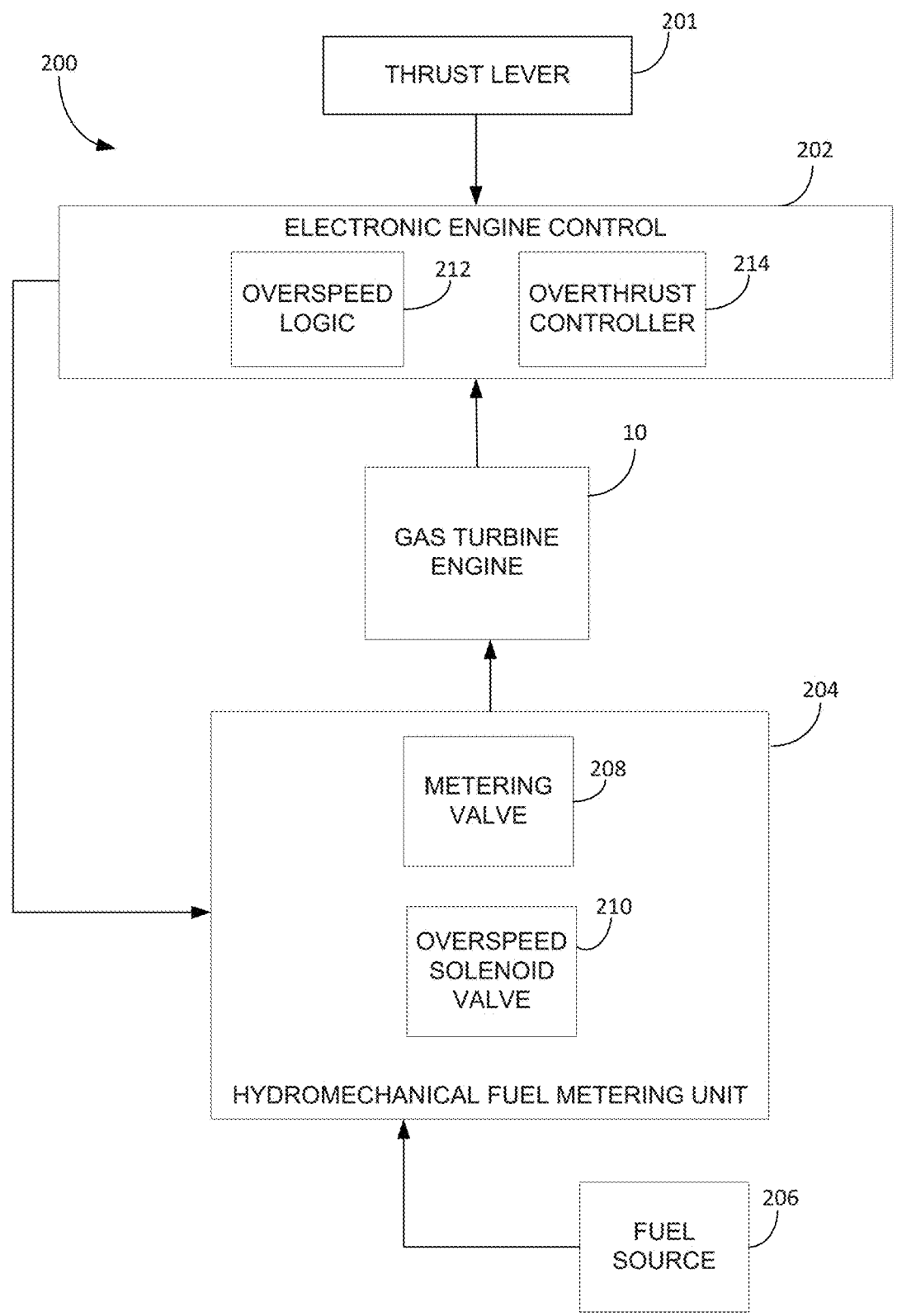
FIG. 2 is a block diagram of an exemplary aircraft system.

FIG. 2 illustrates the gas turbine engine 10 of FIG. 1 within an aircraft 200. Engine thrust is controlled by a full authority digital electronic control (FADEC) which regulates the speed of the high pressure rotor(s) 20, 22 and low pressure rotor(s) 26 in response to a pilot-operated thrust lever, ambient conditions, pilot selection and aircraft discrete inputs. For simplicity, only the main control system components of the FADEC, namely an electronic engine control (EEC) 202, a thrust lever 201, and a hydromechanical fuel metering unit (HMU) 204, are illustrated. The FADEC may be a single channel FADEC or a dual channel architecture.

The HMU 204 is under direct control from the EEC 202 and enables thrust control via a metering valve 208, in response to variable guide vane position demands and fuel flow demands. The metering valve 208 provides the engine 10 with fuel from a fuel source 206 at a required pressure and flow to permit control of engine power. Also provided in the HMU 204 is an overspeed solenoid valve 210, which may be used alone or in conjunction with other valves in the HMU 204 for an engine shutdown in response to an engine overspeed condition. For example, the overspeed solenoid valve 210 may, when energized, open a flow path between pump delivery pressure and bypass pressure across a pump pressure relief valve (not shown). This may cause system pressure to be below a minimum opening pressure of a minimum pressure valve (not shown), thus causing the minimum pressure valve to close and shutting off fuel flow from the fuel source 206 to the engine 10. The overspeed solenoid valve 210 is independent of the metering valve 208 and is used to protect the engine 10 from overspeed.

The EEC 202 comprises overspeed logic 212 to energize the overspeed solenoid valve 210. The overspeed logic 212 energizes the overspeed solenoid valve 210 to remove fuel flow to the engine when an overspeed condition has been detected. The overspeed solenoid valve 210 is typically responsive only to a command received by the pilot, but may be configured to automatically energize upon detection of an overspeed condition while an aircraft is on the ground. Sensor data obtained for a low rotor and/or a high pressure rotor can provide information about the speed of the engine 10, more specifically detection of an overspeed condition. The overspeed logic 212 and overspeed solenoid valve 210 together form an engine overspeed protection unit.

An overthrust controller 214 is provided in the EEC 202 for overthrust protection. The overthrust controller 214 provides a safety mechanism to automatically shut down the engine 10 should an uncontrollable high thrust (UHT) event occur while the aircraft is operating on the ground. A UHT event is understood as an unexpected increase of engine thrust over a commanded engine thrust as provided by the thrust lever 201. An engine thrust threshold may be set to determine whether the unexpected increase of engine thrust qualifies as a UHT event. For example, the engine thrust threshold may be set to 10% thrust increase above a maximum takeoff thrust (MTO) rating for a given engine. This value may be set lower or higher as desired, for example to meet safety requirements, and may vary according to the aircraft and/or aircraft engine. Monitoring and alerting of a UHT event may occur while the aircraft is in the air but engine shutdown is only required when the aircraft is on the ground.

The overthrust controller 214 is configured to measure engine thrust and to detect an overthrust condition (i.e. a UHT event) when the engine thrust threshold has been exceeded. Upon detection of the overthrust condition, the overthrust controller 214 is configured to trigger energizing of the overspeed solenoid valve 210 for automatic engine shut down if the aircraft is on the ground. Detection of an aircraft-on-ground condition may be done using various techniques, such as a weight-on-wheels signal, a ground sensor, an airspeed sensor and a global positioning system. Other techniques may also be used.

In some embodiments, the overthrust controller 214 is coupled directly to the overspeed solenoid valve 210, for example via a switching device. Alternatively, the overthrust controller 214 energizes the overspeed solenoid valve 210 at least in part via the overspeed logic 212. The overthrust controller 214 illustratively comprises one or more computing devices, including but not limited to, a digital computer, a processor (e.g. a microprocessor), and a memory. In some embodiments, the overthrust controller 214 is a combination of software and hardware. In some embodiments, the overthrust controller 214 is a memory having stored thereon program code executable by a processor for performing overthrust protection.

Figure 3:
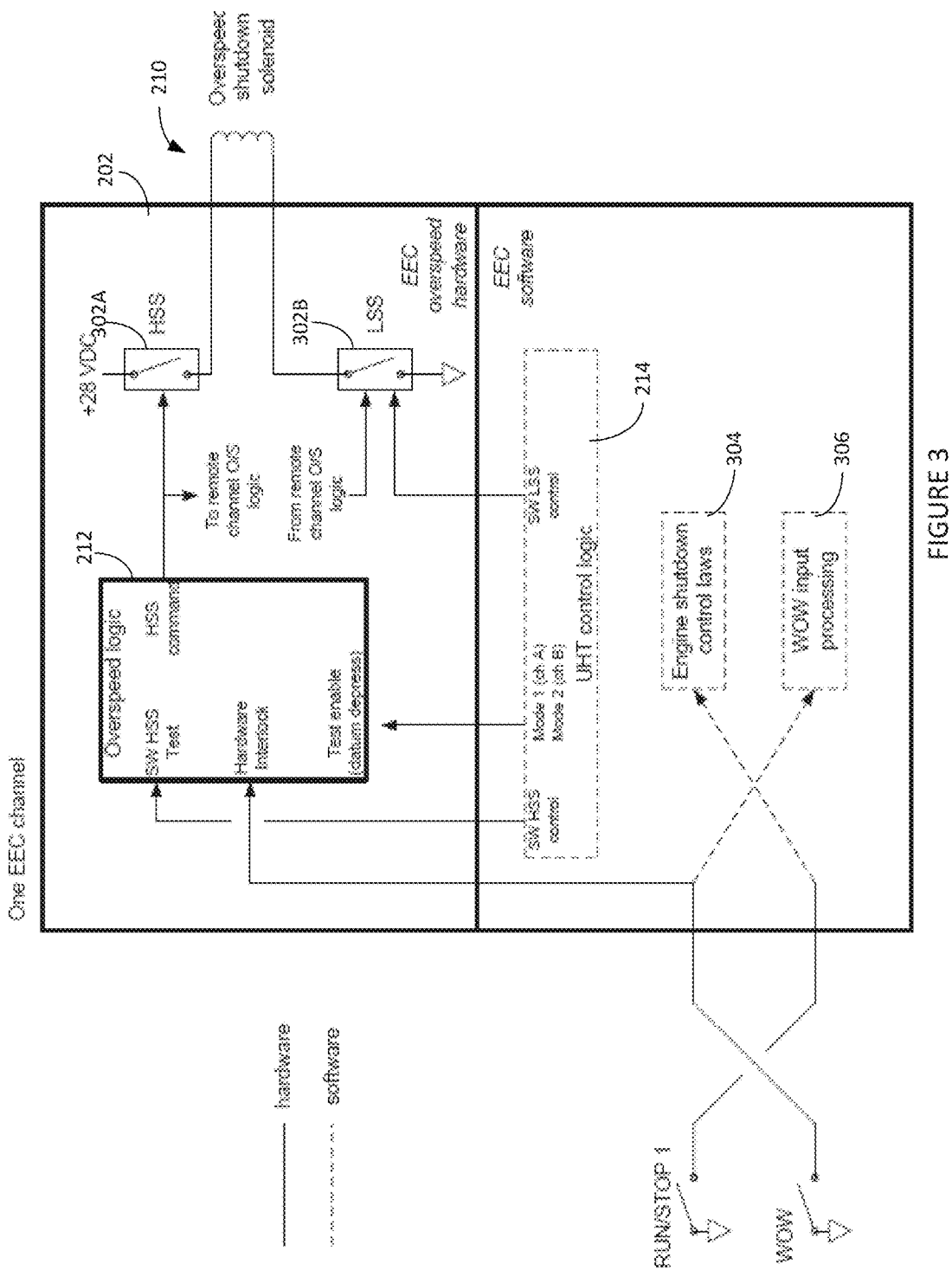
FIG. 3 is a block diagram of an exemplary EEC.

FIG. 3 illustrates an exemplary embodiment for the EEC 202. In this example, the EEC 202 operates in a dual channel FADEC, whereby one channel (ex. Channel A) controls the engine 10 and the other channel (ex. Channel B) is on standby as it monitors for a UHT event. Upon detection of a UHT event and an aircraft-on-ground condition, Channel B provides an engine shut down signal. An engine shut down signal following UHT and aircraft-on-ground detection may be mirrored in Channel A. This architecture provides full independence between engine control and UHT monitoring functions. It also provides full independence between engines of a multi-engine aircraft.

The EEC 202 of FIG. 3 is shown to have a hardware portion and a software portion, represented by full and dotted lines, respectively. The overspeed logic 212 is a hardware module that energizes the overspeed solenoid valve 210 via a switching device having a high side switch (HSS) 302a and a low side switch (LSS) 302b. The overthrust controller 214 is a software module that provides an input to the HSS 302a via the overspeed logic 212 and an input directly to the LSS 302b. The inputs from the overthrust controller 214 to the switches 302a, 302b, are true when the overthrust condition has been detected and false otherwise. An additional input of the overspeed logic 212 is provided by a wire connection to a weight on wheels (WOW) input discrete from the aircraft's airframe. The WOW condition reads true when the aircraft is on the ground and false when the aircraft is not on the ground. This is to ensure that an engine shut down only occurs while the aircraft is on the ground. Note that a UHT event may be detected while the aircraft is in the air. This may result in a UHT fault bit being set without a subsequent engine shutdown. A UHT event which latches in-air does not prevent a subsequent UHT event from being detected and latched on-ground.

Figure 4:
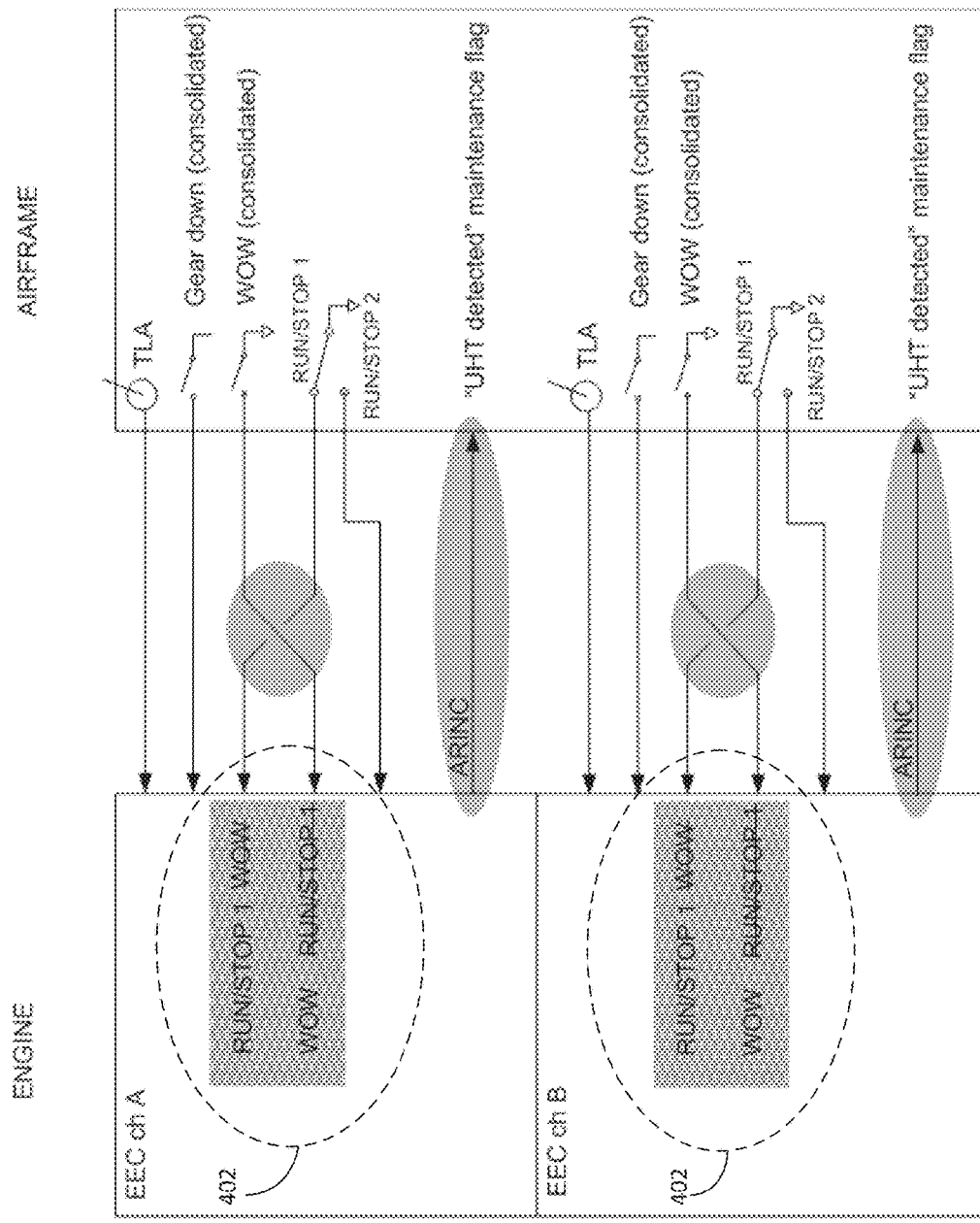
FIG. 4 is a diagram of exemplary wiring between an EEC and an airframe.

The overthrust controller 214 may be used with an aircraft having an existing overspeed protection unit. In some instances, the overspeed logic 212 may be hardwired to run/stop input discretes in the airframe such that the overspeed protection unit is only enabled when the engine is commanded to shut down by a pilot. An external swapping of WOW and run/stop 1 input discretes will allow the overspeed protection unit to be enabled anytime while the aircraft is on the ground. A pin swap may be done in an engine build up (EBU) harness between the airframe and the FADEC, as illustrated in FIG. 4. A corresponding software re-mapping of the WOW and run/stop 1 input discretes is used to reroute the externally swapped input signals to the software modules 402 using these two inputs. Note that the wiring for run/stop 2 is not impacted and can remain as-is. Additional wiring may be provided in the EBU harness to allow a communication signal (e.g. using ARINC) to be transmitted from the EEC to the airframe to set a maintenance flag when a UHT event has been detected.

Referring back to FIG. 3, the overspeed logic 212 is either rewired or initially wired to the WOW input discrete or another aircraft-on-ground input discrete. WOW input processing software module 306 is updated to set WOW to true for the UHT logic in case of a mismatch between the channels, while WOW accommodation for all other functions is unchanged. The Engine shutdown software module 304 is either updated to accommodate the WOW and Run/Stop 1 input swap to ensure the discrete is read from the correct pin or it remains unchanged. A method for overthrust protection thus comprises measuring engine thrust from the engine of the aircraft and detecting an overthrust condition when the measured engine thrust exceeds the engine thrust threshold. The overspeed logic 212 is enabled when the aircraft-on-ground condition is true, and the overspeed solenoid valve 210 is energized for engine shut down when the overthrust condition is detected.

In some embodiments, a throttle lever position is used as an additional condition for engine shut down based on overthrust detection. The engine will not be commanded to shut down unless the throttle lever is in the idle region (forward or reverse). Also alternatively or in combination therewith, a gear down condition may be used as an additional condition for engine shutdown. For example, engine shutdown may be commanded only when all of the following conditions are satisfied: overthrust condition detected, weight-on-wheels true, gear-down true, and throttle lever angle in forward or reverse idle position. In another example, engine shutdown may be commanded only when all of the following conditions are satisfied: overthrust condition detected, weight-on-wheels true, and gear-down true. In yet another example, engine shutdown may be commanded only when all of the following conditions are satisfied: overthrust condition detected, aircraft-on-ground true, and throttle lever angle in forward or reverse idle position. Various combinations of conditions may be used to avoid false positives or as an increased security measure.

Figure 5A:
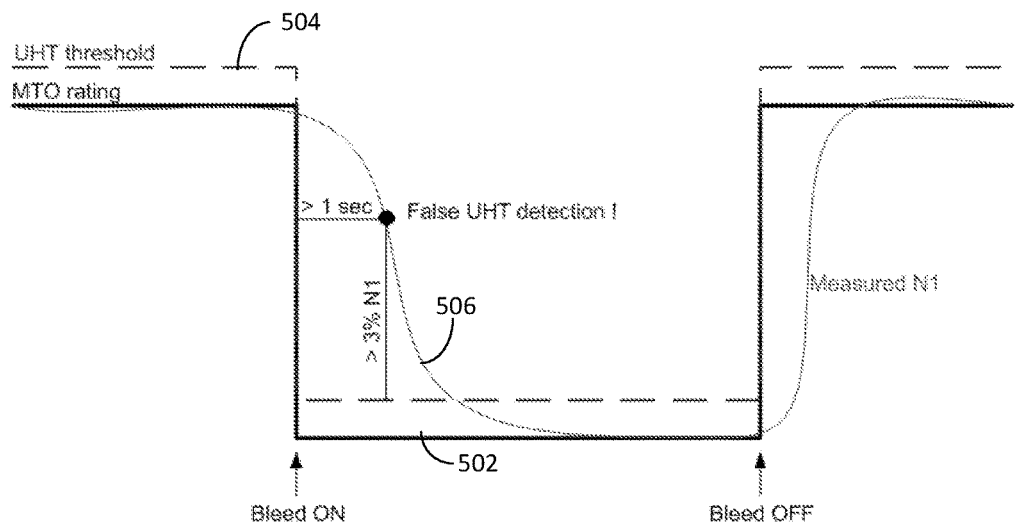
FIGS. 5a and 5b are exemplary thrust measurement diagrams.
Figure 5B:
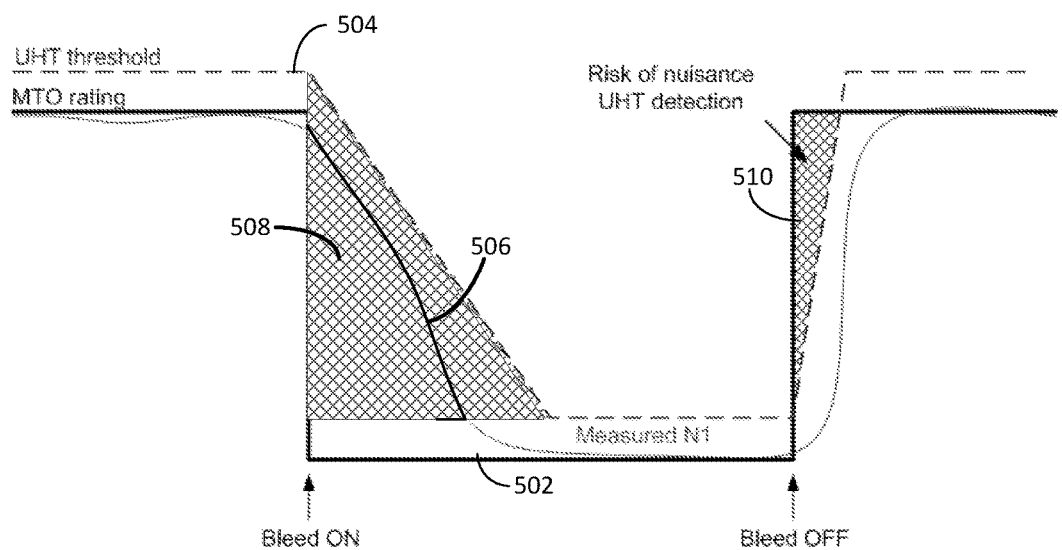

Referring to FIG. 5a, there is illustrated an exemplary MTO rating curve 502 having a step change behavior when bleed is commanded on/off. The measured engine thrust 506 is shown to be horizontally offset from the MTO rating 502. If the thrust threshold 504 is set to mimic the MTO rating with a vertical offset without a horizontal offset, there is a potential for a false UHT detection. A timing condition, such as a latch timer, may be used to account for this lag in time. The latch timer may be set to a value known to be sufficient to account for the lag time between the MTO rating 502 and the measured thrust 506, such as 1 second, 2 seconds, etc. In addition, as shown in FIG. 5b, the thrust threshold 504 may be modulated to take into account the worst case lag time between the MTO rating 502 and the measured thrust 506. This lag time can be implemented by applying a rate limit to the UHT trip threshold. However, this exposes the aircraft to a diminished overthrust protection for a period of time 508 after bleed on. A rate limit should not be applied when there is an increase in rating when bleed is selected off, as it would increase the risk of nuisance UHT detection for a brief period 510 after bleed off.

The above description is meant to be exemplary only, and one skilled in the relevant arts will recognize that changes may be made to the embodiments described without departing from the scope of the invention disclosed. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. An overthrust protection system for an engine of an aircraft, the system comprising:
a hardware portion comprising overspeed logic that energizes an overspeed solenoid valve via a switching device having a high side switch and a low side switch, wherein the overspeed logic is connected to the high side switch of the switching device; and
a software portion comprising an overthrust controller that provides an input to the overspeed logic to operate the high side switch and an input directly to the low side switch,
wherein the input to the overspeed logic and the input to the low side switch are true when an overthrust condition has been detected and false otherwise;
an additional input being provided to the overspeed logic by a weight on wheels input;
wherein the overthrust controller is configured to measure engine thrust and to detect the overthrust condition when a measured engine thrust exceeds an engine thrust threshold, and the engine thrust threshold is reduced at a temporal offset from a step change reduction in a maximum takeoff thrust resulting from bleed air being commanded on,
wherein the overspeed logic is configured to energize the solenoid valve when the weight on wheels input is true and the overthrust condition is detected;
wherein the hardware portion and the software portion are part of an electronic engine control (EEC) in a full authority digital engine control (FADEC).

2. The system of claim 1, wherein an uncontrollable high thrust fault bit is set when the overthrust condition has been detected and the aircraft is not on the ground, without a subsequent engine shutdown.

3. The system of claim 1, wherein the weight on wheels input is connected to a weight on wheels input discrete of an airframe of the aircraft through a wire connection.

4. The system of claim 1, wherein the weight on wheels input is connected to an input discrete in an airframe of the aircraft via an external swapping of input discretes, and the software portion comprises a re-mapping of the input discretes to reroute the externally swapped input discretes.

5. The system of claim 4, wherein the external swapping of input discretes is in an engine build up harness between the airframe and the FADEC.

6. The system of claim 1, wherein the overspeed logic is configured to energize the solenoid valve when the weight on wheels input is true, the overthrust condition is detected, and a throttle lever is in an idle region.

7. The system of claim 1, wherein the overspeed logic is configured to energize the solenoid valve when the weight on wheels input is true, the overthrust condition is detected, a throttle lever is in an idle region, and a gear-down condition has been met.

8. The system of claim 1, wherein the FADEC is a dual channel FADEC having a first channel that controls the engine and a second channel on standby as it monitors the overthrust condition.

* * * * *